Patented Sept. 2, 1941

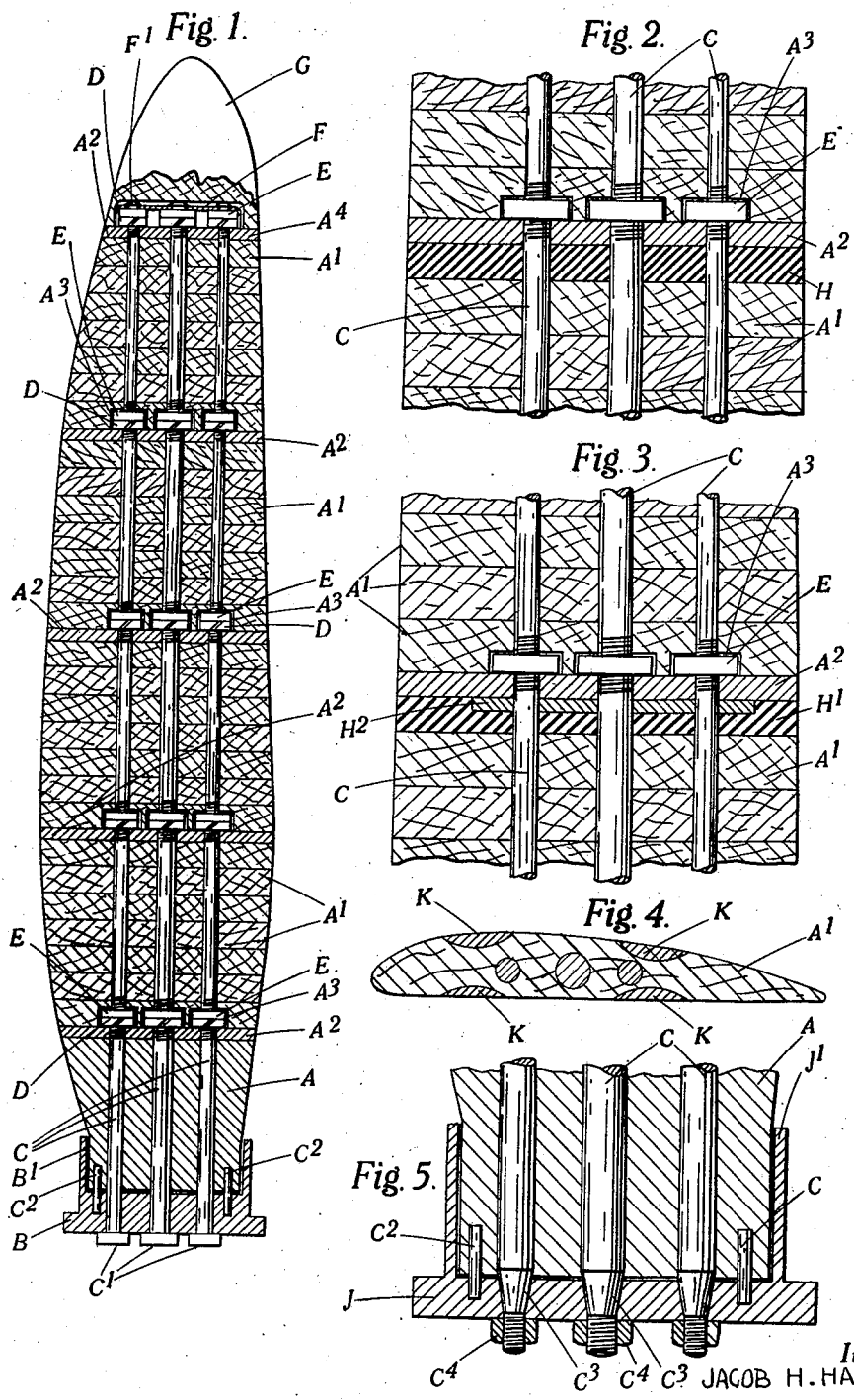

2,254,821

UNITED STATES PATENT OFFICE 2,254,821

AIRSCREW BLADE CONSTRUCTION

Jakob Heinrich Haw, London, England

Application January 5, 1939, Serial No. 249,495
In Great Britain January 7, 1938

13 Claims. (Cl. 170—159)

This invention relates to the construction of airscrew blades of the type transversely divided at intervals, for example by being formed of transverse laminae, and reinforced by one or more tension members extending radially within the body of the blade.

Airscrew blades are subjected to high centrifugal loads as well as torsional and bending loads, and one object of the invention is to provide a blade which, though it may be constructed of light material, will satisfactorily withstand all the stresses to which it is subjected in use. A further object of the invention is to provide a blade of the above type, in which each tension member is furnished with anchoring devices at intervals in the length of the blade and said devices acting radially inwards on the transversely divided portions of the blade through resilient intermediate thrust members. Yet another object of the invention is to provide initial compression of the transversely divided portions or laminae by adjusting each anchoring device so that the corresponding resilient intermediate thrust member is under compression and when the blade is in operation the said compression tends wholly or partially to balance the centrifugal load.

The invention may be carried into practice in various ways but one construction together with some modifications are illustrated somewhat diagrammatically and by way of example in the accompanying drawing, in which Figure 1 is a longitudinal section through the central plane of the blade, Figures 2 and 3 show on an enlarged scale modified arrangements of the resilient thrust members, Figure 4 is a cross-section of the blade shown in Figure 1, and Figure 5 illustrates, on an enlarged scale, a modified arrangement for securing the tension rods to the hub fitting.

In the construction shown in Figure 1 the root portion A of the blade extends into a sleeve-like part $B^1$ of a hub fitting B adapted to be secured to the airscrew boss (not shown). The blade is built up of transverse laminae $A^1$ of soft wood which are glued face to face in groups separated by hard wood distributing layers $A^2$. The laminae $A^1$ and distributing layers $A^2$ are provided with apertures which, during assembly, register and thus provide passages for three tension rods C. Each tension rod is provided with a head $C^1$ at one end for engaging the hub fitting B, the tension rods C tapering towards the blade tip. The tension rods are screw-threaded at those parts thereof corresponding to the positions of the distributing layers $A^2$ between the groups of laminae.

Having placed the root portion A over the tension rods C so that the root of the blade extends into the sleeve $B^1$, a hard wood distributing layer $A^2$ is placed over the rods, and spring washers D constituting resilient intermediate thrust members are placed on the rods C so as to lie against the distributing layer $A^2$. Nuts E constituting anchoring devices are then screwed down firmly on to the spring washers D, and a lamination $A^1$ is then placed on to the tension rods C, this lamination having three recesses $A^3$ to accommodate the nuts and washers E and D. Several laminae $A^1$ are then placed on to the tension rods C in a group and a further hard wood distributing layer $A^2$ and nuts and washers E and D are applied. The laminae $A^1$ are glued together and to the layers $A^2$, the root A being glued to the adjacent layer $A^2$.

Having in this way built up the body of the blade by successive groups of laminae with their associated clamping nuts and thrust washers, a final hard wood layer $A^4$ is placed on the tension bolts over the last lamination $A^1$ and nuts E and spring washers D are applied to the ends of the tension rods C. A locking plate F is then arranged over the free ends of the tension rods and these ends are riveted or clinched over as shown at $F^1$.

When each set of clamping nuts E is screwed in position the group or pack of laminae $A^1$ lying between the corresponding hard wood layer $A^2$ and the next hard wood layer nearer to the boss is placed under compression, each group or pack of laminae being compressed according to the elasticity of the materials employed, centrifugal load to which this part of the blade is to be subjected, and the degree of relief from such load which is to be provided. It can thus be arranged that all the soft and light material of the blade, with the exception of the extreme tip G, can be placed under and maintained in compression while the blade is not in use, the tension rods C alone being subjected to tensile stress. Thus, when the blade is in operation, the centrifugal force acting on each group of laminae tends to be balanced by the initial inward pressure applied by the corresponding anchoring nuts E through the resilient thrust washers D so that, though the blade is made of light material, it is capable of satisfactorily withstanding working stresses which in normal constructions of blade could only be met by substantial increase in the dimensions and weight of the blade.

The root or shank A of the blade makes a sufficiently tight fit within the sleeve B¹ to avoid risk of appreciable vibration and to resist bending and torsional stresses, but this fit is not so tight as to prevent a certain degree of freedom of longitudinal creep of the root A in the direction of the length of the sleeve B¹. If desired pegs C² extending from the member B into the root A of the blade may be provided so as to increase the resistance to torsional stresses on the blade.

A modified arrangement of the resilient thrust members is shown in Figure 2 in which a layer H of resilient material, for example rubber, constituting a resilient intermediate thrust member is provided between each stack of laminae A¹ and the associated hard wood distributing layer A² against which the clamping nuts E bear directly. With this arrangement, as opposed to that described with reference to Figure 1, the inward thrust applied to each stack or group of laminae A¹ is transmitted from the hard wood distributing layer A² through the resilient intermediate layer H so that the resilience provided by the lamination A is evenly distributed throughout the section of the blade. In the modified arrangement shown in Figure 3 each resilient layer H¹ (for example of rubber) has an annular recess for receiving a supplementary distributing layer H² of metal which further reduces the tendency for localised application of the forces applied by the anchoring nuts E.

As will be seen from Figure 4, the blade is furnished with longitudinal stiffeners K which extend substantially throughout the length of the transversely subdivided blade. The stiffeners K, which are preferably of wood which is harder than, or has better tensile properties than, the material of the laminae A¹, may be secured in grooves in the surfaces of the blade as for example by tongue and groove, dovetail or like connections, with or without additional pinning and gluing. The stiffeners K conveniently taper in cross-sectional area from that end adjacent to the hub to the end adjacent to the blade tip.

Instead of the tension rods C being provided with heads C¹ as shown in Figure 1, the rods may be secured in position by nuts, for example as shown in Figure 5. In this arrangement the blade root A extends into a sleeve J¹ formed on a hub fitting J which is furnished with three conical passages adapted to receive conical end portions C³ of the tension rods C. By tightening nuts C⁴ the tension rods are firmly secured to the member J due to the wedge-like action of the conical portions C³ of the rods in the conical passages.

The resilient intermediate thrust members not only tend to take up the centrifugal load applied to the transversely divided portions or laminae but also counteract the effects of expansion and contraction due to variations in temperature.

It will be understood that the constructions above described are given by way of example only and that details may be modified to suit requirements. For example, instead of the same form and arrangement of the resilient intermediate thrust member being employed at all the anchorage points in the length of the blade, different forms and arrangements of resilient thrust member may be utilised in one and the same blade.

What I claim as my invention and desire to secure by Letters Patent is:

1. In an airscrew blade, in combination, a root portion for attachment to a boss or hub, a blade body transversely divided at intervals in its length, at least one tension member anchored to the hub and extending therefrom through the blade portions towards the blade tip, a plurality of anchoring devices carried by the tensioning member at the said intervals, and an intermediate thrust member of greater resilience than the blade portions and disposed between each anchoring device and the adjacent blade portion to which a thrust is transmitted radially inwards from the corresponding anchoring device through the associated resilient intermediate thrust member.

2. In an airscrew blade, in combination, a root portion for attachment to a boss or hub, a plurality of laminae transverse to the length of the blade formed thereby, at least one tension member anchored to the hub and extending therefrom through the laminae towards the blade tip, a plurality of anchoring nuts in screwthreaded engagement with the rod at intervals in its length, and an intermediate thrust member of greater resilience than the laminae and disposed between each anchoring nut and the adjacent lamination, a thrust being transmitted radially inwards from each anchoring nut through the associated resilient intermediate thrust member to the laminae.

3. In an airscrew blade, in combination, a root portion for attachment to a boss or hub, a plurality of laminae transverse to the length of the blade formed thereby, at least one tension member anchored to the hub and extending therefrom through the laminae towards the blade tip, a plurality of anchoring nuts in screwthreaded engagement with the tension member at intervals in its length, a plurality of the laminae lying in each of the said intervals between the anchoring nuts, and a resilient intermediate thrust member disposed between each anchoring nut and the adjacent group of laminae to which a thrust is transmitted radially inwards from the corresponding anchoring nut through the associated resilient intermediate thrust member.

4. In an airscrew blade, in combination, a root portion for attachment to a boss or hub, a blade body transversely divided at intervals in its length, at least one tension rod anchored to the hub and extending therefrom through the blade portions towards the blade tip, a plurality of anchoring nuts in screwthreaded engagement with the rod at intervals in its length, distributing layers disposed at the said intervals adjacent to the anchoring nuts, the said distributing layers being of material which is harder than the blade portions, and a resilient intermediate thrust member disposed between each anchoring nut and the associated distributing layer, a thrust being transmitted radially inwards from each anchoring nut through the corresponding resilient intermediate thrust member and thence through the associated distributing layer to the blade portions.

5. In an airscrew blade, in combination, a root portion for attachment to a boss or hub, a blade body transversely divided at intervals in its length, at least one tension rod anchored to the hub and extending therefrom through the blade portions towards the blade tip, a plurality of anchoring nuts in screwthreaded engagement with the rod at intervals in its length, distributing layers disposed at the said intervals adjacent to the anchoring nuts, the said distributing layers being of material which is harder than the blade portions, and a resilient intermediate thrust member between each distributing layer and the blade portion, a thrust being transmitted radially inwards from each anchoring nut through the corresponding distributing layer and thence through the associated resilient thrust member to the adjacent blade portion.

6. An airscrew blade as claimed in claim 4, in which each resilient intermediate thrust member is constituted by a spring washer which bears directly on the adjacent distributing layer.

7. An airscrew blade as claimed in claim 5, in which each resilient intermediate thrust member is constituted by a layer of resilient material which is softer than that of the blade portions.

8. An airscrew blade as claimed in claim 5, in which each resilient intermediate thrust member is constituted by a layer of rubber.

9. An airscrew blade as claimed in claim 5, in which each resilient intermediate thrust member is constituted by a layer of resilient material which is softer than that of the blade portions, and a supplementary distributing plate of metal is arranged between the resilient layer and the associated distributing layer.

10. An airscrew blade as claimed in claim 4, in which each distributing layer is of hard wood.

11. An airscrew blade as claimed in claim 5, in which each distributing layer is of hard wood.

12. In an airscrew blade, in combination, a hub fitting for attachment to a hub or boss, a root portion which fits within the hub fitting with a predetermined degree of freedom of movement relatively thereto, a blade body transversely divided at intervals in its length, at least one tension member anchored to the hub fitting and extending therefrom through the blade portions towards the tip thereof, and a plurality of anchoring devices in engagement with the tensioning member at the said intervals, a thrust being transmitted radially inwards from each anchoring device to the adjacent blade portion, the said tension member having a conical end portion which is drawn and locked by wedge action in a conical passage in the hub fitting by a nut in screwthreaded engagement with the end of the rod lying within the hub fitting.

13. In an airscrew blade, in combination, a hub fitting for attachment to a hub or boss, a radial sleeve carried by the hub fitting, a blade root which fits within the sleeve with a predetermined degree of freedom of movement relatively thereto, a plurality of laminae transverse to the length of the blade body formed thereby, at least one longitudinal stiffening strip embedded in the surface of the blade, a plurality of tension rods anchored to the hub fitting and extending therefrom through the blade body towards the tip thereof, a plurality of anchoring nuts in screwthreaded engagement with each rod at intervals in its length, and a resilient intermediate thrust member disposed between each anchoring device and an adjacent lamination, each anchoring device transmitting a thrust radially inwards through the associated resilient thrust member to the adjacent laminae when the blade is at rest, the said thrust opposing that due to centrifugal force when the blade is in operation.

JAKOB HEINRICH HAW.